US010678230B2

(12) United States Patent  
Takama et al.

(10) Patent No.: US 10,678,230 B2  
(45) Date of Patent: Jun. 9, 2020

(54) SENSOR DIAGNOSTIC SYSTEM

(71) Applicants: DENSO International America, Inc., Southfield, MI (US); DENSO CORPORATION, Kariya, Aichi-pref. (JP)

(72) Inventors: Daisuke Takama, Southfield, MI (US); Matthew Gesch, Livonia, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 323 days.

(21) Appl. No.: 15/896,283

(22) Filed: Feb. 14, 2018

(65) Prior Publication Data

US 2019/0250597 A1  Aug. 15, 2019

(51) Int. Cl.
  *G05B 23/02* (2006.01)
  *B60W 50/14* (2020.01)
  *G05B 19/042* (2006.01)

(52) U.S. Cl.
  CPC ......... *G05B 23/0218* (2013.01); *B60W 50/14* (2013.01); *G05B 19/042* (2013.01); *G05B 23/0216* (2013.01); *G05B 23/0272* (2013.01); *G05B 23/0213* (2013.01); *G05B 2219/2637* (2013.01)

(58) Field of Classification Search
  CPC .............. G05B 23/0218; G05B 19/042; G05B 23/0272; G05B 23/0216; G05B 2219/2637; G05B 23/0213; B60W 50/14
  See application file for complete search history.

(56) References Cited

U.S. PATENT DOCUMENTS

| | | | |
|---|---|---|---|
| 7,339,462 B1* | 3/2008 | Diorio | H04S 7/30 340/456 |
| 8,467,956 B2 | 6/2013 | Lee et al. | |
| 8,798,841 B1* | 8/2014 | Nickolaou | B62D 15/0265 701/23 |
| 2014/0136044 A1* | 5/2014 | Conrad | B60W 30/09 701/23 |
| 2016/0001702 A1* | 1/2016 | Wright | B60Q 9/008 340/435 |
| 2019/0202467 A1* | 7/2019 | Sun | B60W 50/12 |

FOREIGN PATENT DOCUMENTS

| | | |
|---|---|---|
| JP | 2007051888 A | 3/2007 |
| JP | 2007228448 A | 9/2007 |
| JP | 2008060874 A | 3/2008 |

* cited by examiner

*Primary Examiner* — Mary Cheung

(74) *Attorney, Agent, or Firm* — Harness, Dickey & Pierce, P.L.C.

(57) ABSTRACT

A diagnostic system for identifying vehicle sensors impaired by a foreign substance. The system includes a plurality of vehicle sensors configured to facilitate navigation of a vehicle in an environment. A gear shift detection sensor is configured to detect a gear position of the vehicle. A control module is configured to identify which of the plurality of vehicle sensors is impaired by a foreign substance; and identify for an operator of the vehicle which of the plurality of vehicle sensors is impaired due to the foreign substance based on the gear position of the vehicle.

20 Claims, 5 Drawing Sheets

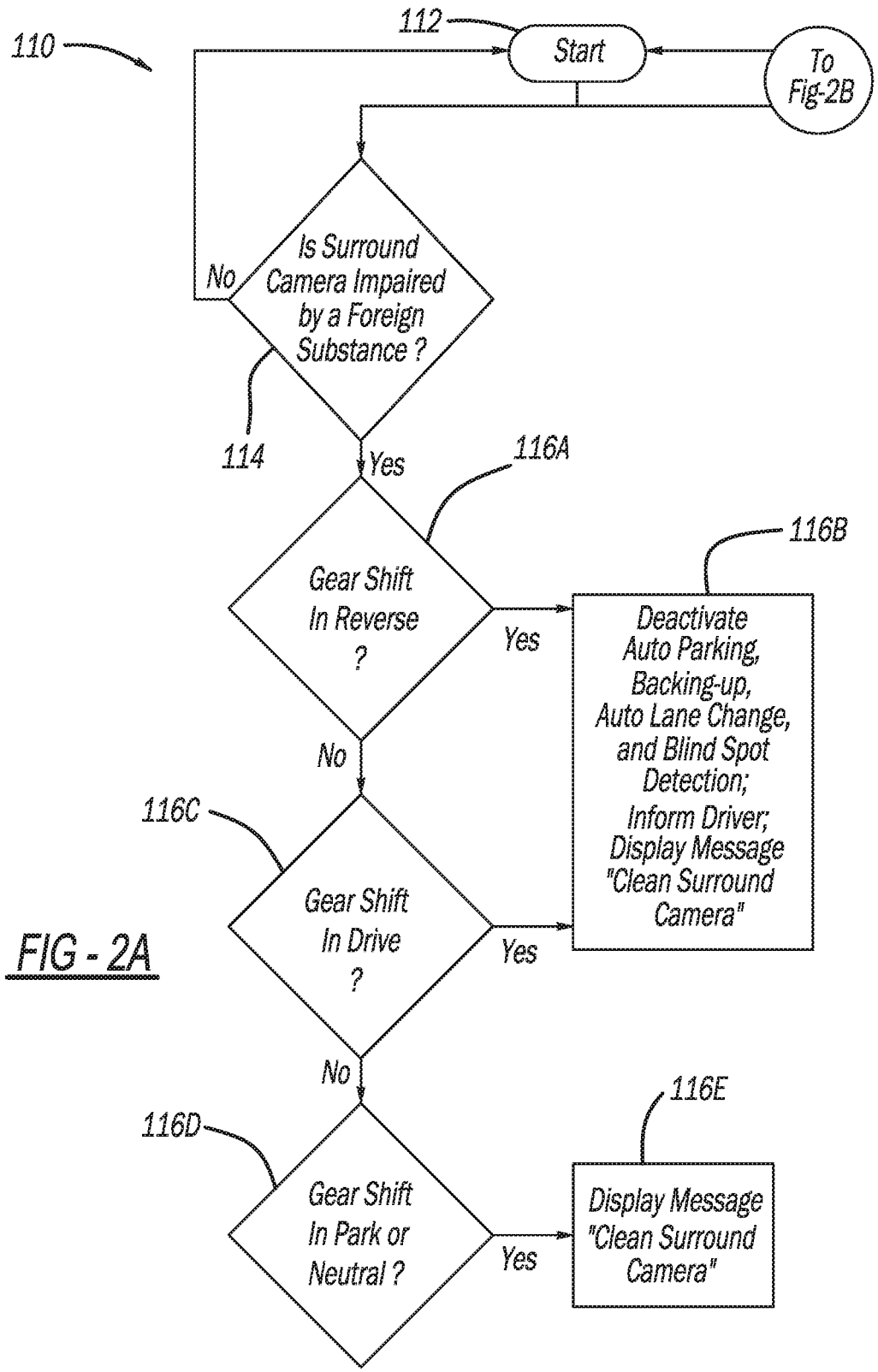

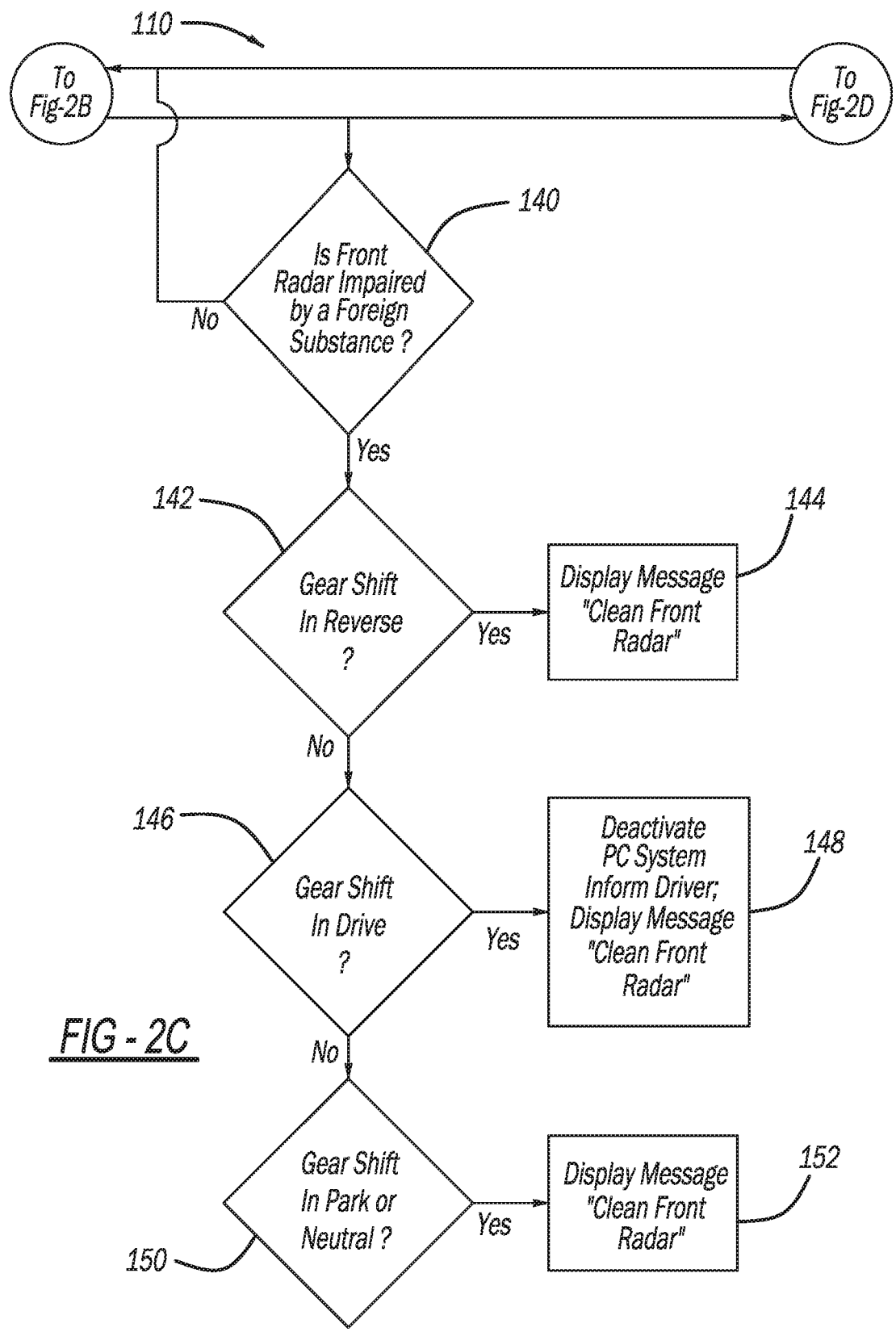

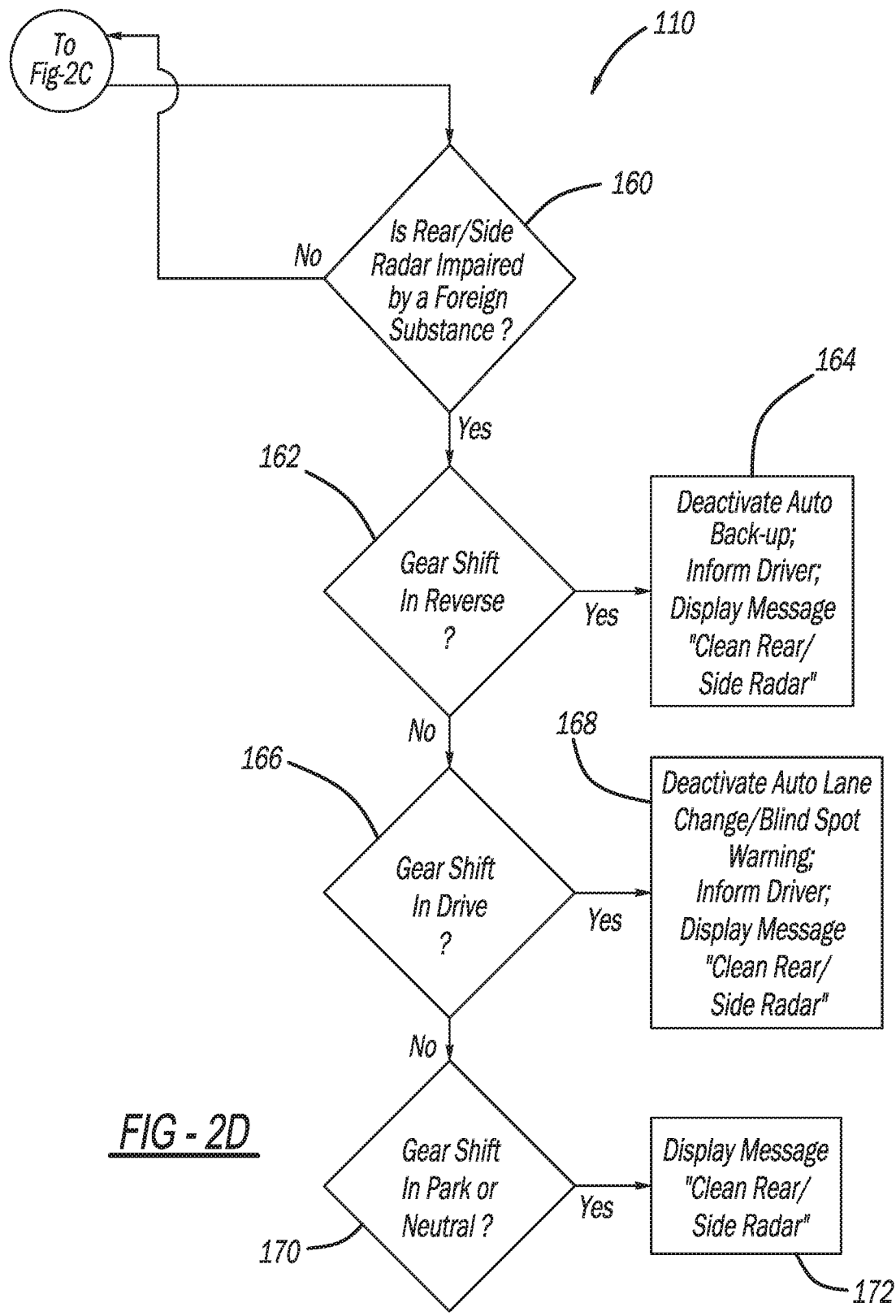

SENSOR DIAGNOSTIC SYSTEM

FIELD

The present disclosure relates to a diagnostic system for vehicle sensors, such as vehicle safety and navigation sensors for example.

BACKGROUND

This section provides background information related to the present disclosure, which is not necessarily prior art.

Vehicles are becoming equipped with an ever increasing number of sensors to monitor the area about the vehicle, such as surround cameras, clearance sonar sensors, front radar, rear radar, side radar, etc. The sensors are typically exposed to the environment, which may result in a foreign substance (such as dirt, mud, ice, snow, etc.) becoming attached to the sensors and impairing their functionality. Although systems exist for informing a vehicle operator when sensor functionality is impaired, such current systems are subject to improvement. For example, current systems merely issue a general sensor failure alert, and do not tell the operator exactly which one(s) of the sensors is impaired. As a result, the operator is forced to check all of the sensors, which is a time consuming and tedious task, especially in view of the ever increasing number of sensors being installed on vehicles. Furthermore, current systems often distract the operator with sensor alerts that are not relevant to the current operating state of the vehicle. For example, current systems issue a general sensor alert when a rear, backup radar sensor is impaired even when the vehicle is traveling forward. The present disclosure provides for an improved sensor diagnostic system that addresses these shortcomings in the art, and provides numerous additional advantages as explained herein and as one skilled in the art will recognize.

SUMMARY

This section provides a general summary of the disclosure, and is not a comprehensive disclosure of its full scope or all of its features.

The present disclosure provides for a diagnostic system for identifying vehicle sensors impaired by a foreign substance. The system includes a plurality of vehicle sensors configured to facilitate navigation of a vehicle in an environment. A gear shift detection sensor is configured to detect a gear position of the vehicle. A control module is configured to identify which of the plurality of vehicle sensors is impaired by a foreign substance; and to identify for an operator of the vehicle which of the plurality of vehicle sensors is impaired due to the foreign substance based on the gear position of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 2A illustrates exemplary operation of the diagnostic system according to the present disclosure;

FIG. 2C is a continuation of FIGS. 2A and 2B; and

FIG. 2D is a continuation of FIG. 2C.

Corresponding reference numerals indicate corresponding parts throughout the several views of the drawings.

DETAILED DESCRIPTION

Example embodiments will now be described more fully with reference to the accompanying drawings.

Figure 1:
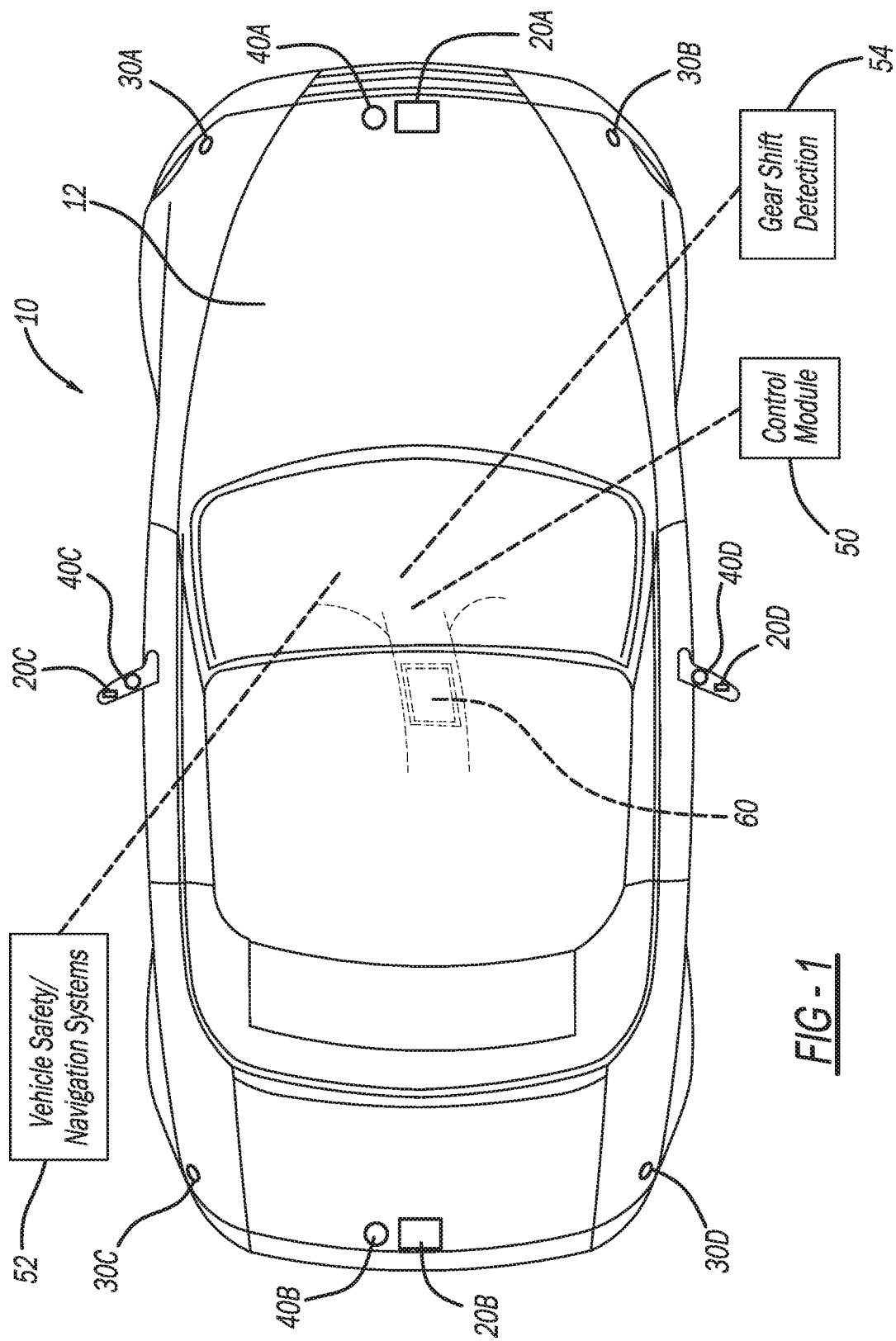
FIG. 1 illustrates a diagnostic system in accordance with the present disclosure installed in an exemplary vehicle.

FIG. 1 illustrates a diagnostic system 10 for identifying vehicle sensors impaired by a foreign substance, as installed in an exemplary vehicle 12. The diagnostic system 10 can be configured for use with any suitable vehicle, such as any suitable passenger vehicle, utility vehicle, recreational vehicle, mass transit vehicle, military vehicle, commercial vehicle, construction vehicle/equipment, etc. The system 10 includes a plurality of vehicle sensors configured to facilitate navigation of the vehicle 12 in an environment. Any suitable vehicle sensors can be used, and arranged at any suitable positions about the vehicle 12. Exemplary sensors that may be included with the diagnostic system 10 include, but are not limited to, the following: radar, camera, sonar, LIDAR, ultrasonic, vehicle-to-vehicle, vehicle-to-infrastructure, etc. The sensors can be used to facilitate any suitable navigation and/or safety functionality, such as, but not limited to, at least the following: surround camera; autonomous driving; autonomous parking; autonomous back-up; parking assist; back-up assist; lane-change assist; blind-spot detection; pedestrian/object detection, etc. Such functionally is generally identified in FIG. 1 at reference numeral 52 at "Vehicle Safety/Navigation Systems."

In the example illustrated, the system 10 includes the following cameras for a surround camera system: camera 20A at a front grill of the vehicle 12; camera 20B at a rear of the vehicle 12; and cameras 20C and 20D at side mirrors of the vehicle 12. Any other suitable number of cameras may be included and arranged at any other suitable locations about the vehicle 12. The images captured by the cameras 20A-20D are combined to provide a surround view of the vehicle 12, which is displayed to an operator of the vehicle 12 in any suitable manner, such as on a display screen 60.

The plurality of sensors further includes sonar sensors 30A, 30B, 30C, and 30D at all four corners of the vehicle 12. The sonar sensors 30A-30D advantageously detect objects about the vehicle 12 to enable various features, such as automatic parking and/or backup assist features. The sonar sensors 30A-30D can be arranged at any other suitable locations about the vehicle 12 as well, and any other suitable sensors other than sonar sensors may be used as well.

The plurality of sensors may further include radar sensors, such as front radar sensor 40A oriented towards a front of the vehicle 12, rear radar sensor 40B oriented towards a rear of the vehicle 12, and side radar sensors 40C and 40D oriented towards sides of the vehicle 12. The radar sensors 40A-40D are configured to detect objects about the vehicle 12, such as other vehicles and pedestrians, for example. The radar sensors 40A-40D may be used with any suitable vehicle functionality, such as a pre-collision system (which warns the operator that a collision is highly possible, and may apply the vehicle's brakes), automatic lane change functionality, and/or automatic back-up functionality. Any suitable number of radar sensors may be included and arranged at any suitable positions about the vehicle 12, and any other sensors may be used.

The vehicle sensors are controlled by a control module 50. In this application, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module 50 described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 50 is configured to run diagnostic tests on each one of the vehicle sensors to identify exactly which one(s) of the vehicle sensors is (are) impaired by a foreign substance, such as, but not limited to, the following: dirt, mud, ice, snow, etc. Any suitable diagnostic testing may be run by the control module 50. For example, the control module 50 can be configured to run an optical flow test whereby images captured by the sensors are analyzed to identify an object that remains stationary while all other features of the environment move as the vehicle 12 moves. Any object that remains stationary is most likely a foreign substance attached to the sensor, which is likely to impair operation of the sensor. The control module 50 can also be configured to analyze the contrast of images captured by the plurality of sensors. If the contrast becomes reduced (i.e., objects appear blurry) then most likely a foreign substance has become attached, thereby degrading the image captured and impairing sensor functionality. The control module 50 can also be configured to measure the reflection strength of each sensor. If the control module 50 measures an unexpected decrease in reflection strength, the decrease is most likely attributable to presence of a foreign substance on the sensor.

The control module 50 is further configured to generate alerts notifying the operator of the vehicle of exactly which one(s) of the plurality of sensors is/are likely impaired by a foreign substance, and thus needs to be cleaned. For example, the control module 50 is configured to operate any suitable display screen 60 in order to alert the operator. Any suitable alerts can be provided. For example, the control module 50 may control the display screen 60 to display an exemplary image of the vehicle 12 showing exactly which sensor(s) need to be cleaned and the location thereof about the vehicle 12 so that the operator can easily find the sensor and clean it. The control module 50 is further configured to disable any vehicle safety/navigation systems 52 that rely on sensors that the control module 50 has determined to be impaired by a foreign substance. The vehicle safety/navigation systems 52 include, but are not limited to, those set forth above.

The control module 50 generates the alerts to the operator for the impaired sensors and disabled vehicle safety/navigation systems 52 based on the gear that the vehicle is operating in so that the driver is not distracted by notifications that are not relevant to the gear that the vehicle 12 is currently in. To identify the current gear of the vehicle, the control module 50 is in communication with gear shift detection sensor 54. The gear shift detection sensor 54 generates a signal to the control module 50 based on the current gear of the vehicle 12, such as drive, reverse, or park, for example. When the vehicle is in drive, the control module 50 will only generate alerts to the operator that are relevant to forward drive operation of the vehicle, such as alerts notifying the driver that a pre-collision system, blind spot detection system, and/or automatic lane change functionality has been deactivated by the control module 50 because the sensors relied on for such functionality have been impaired by a foreign substance and need to be cleaned. Additional examples will now be described with reference to FIGS. 2A-2D and reference numeral 110.

Exemplary operation of the diagnostic system 10 will now be described in further detail with reference to FIGS. 2A-2D and reference numeral 110. Starting at reference numeral 112, the control module 50 identifies exactly which ones of the plurality of vehicle sensors (20A-20D, 30A-30D, 40A-40D, for example) are impaired by a foreign substance in any suitable manner, such as by measuring optical flow, contrast, or reflection strength, as explained above, or in any other suitable manner. With reference to block 114 of FIG. 2A, if any of the cameras 20A-20D of the surround camera system is obscured by a foreign substance, the control module 50 proceeds to block 116A. If none of the cameras 20A-20D are obscured, the control module 50 returns to block 112. At block 116A, the control module 50 identifies the gear position of the vehicle based on data received from the gear shift detection sensor 54. If the vehicle is in reverse, the control module 50 proceeds to block 116B. At block 116B, the control module 50 deactivates any of the vehicle safety/navigation systems 52 that rely on any of the cameras 20A-20D of the surround camera system, such as automatic parking, backup assist, lane change assist, automatic lane change, blind spot detection, etc. The control module 50 also operates the display screen 60 to identify the specific cameras 20A, 20B, 20C, 20D in need of cleaning. If at block 116A the vehicle is not in reverse gear, the control module 50 proceeds to block 116C, where based on inputs from the gear shift detection sensor 54 the control module 50 determines whether the vehicle is in drive. If the vehicle is in drive, the control module 50 also proceeds to block 116B. If at block 116C the vehicle is not in drive, the control module 50 proceeds to block 116D. If at block 116D the vehicle 12 is in park or neutral, control module 50 proceeds to block 116E. At block 116E the control module 50 identifies for the operator of the vehicle exactly which one of the cameras 20A, 20B, 20C, 20D needs cleaning (and may display the message "Clean Surround Camera" in addition to, or in place of, identifying the specific camera 20A, 20B, 20C, 20D in need of cleaning).

Figure 2B:
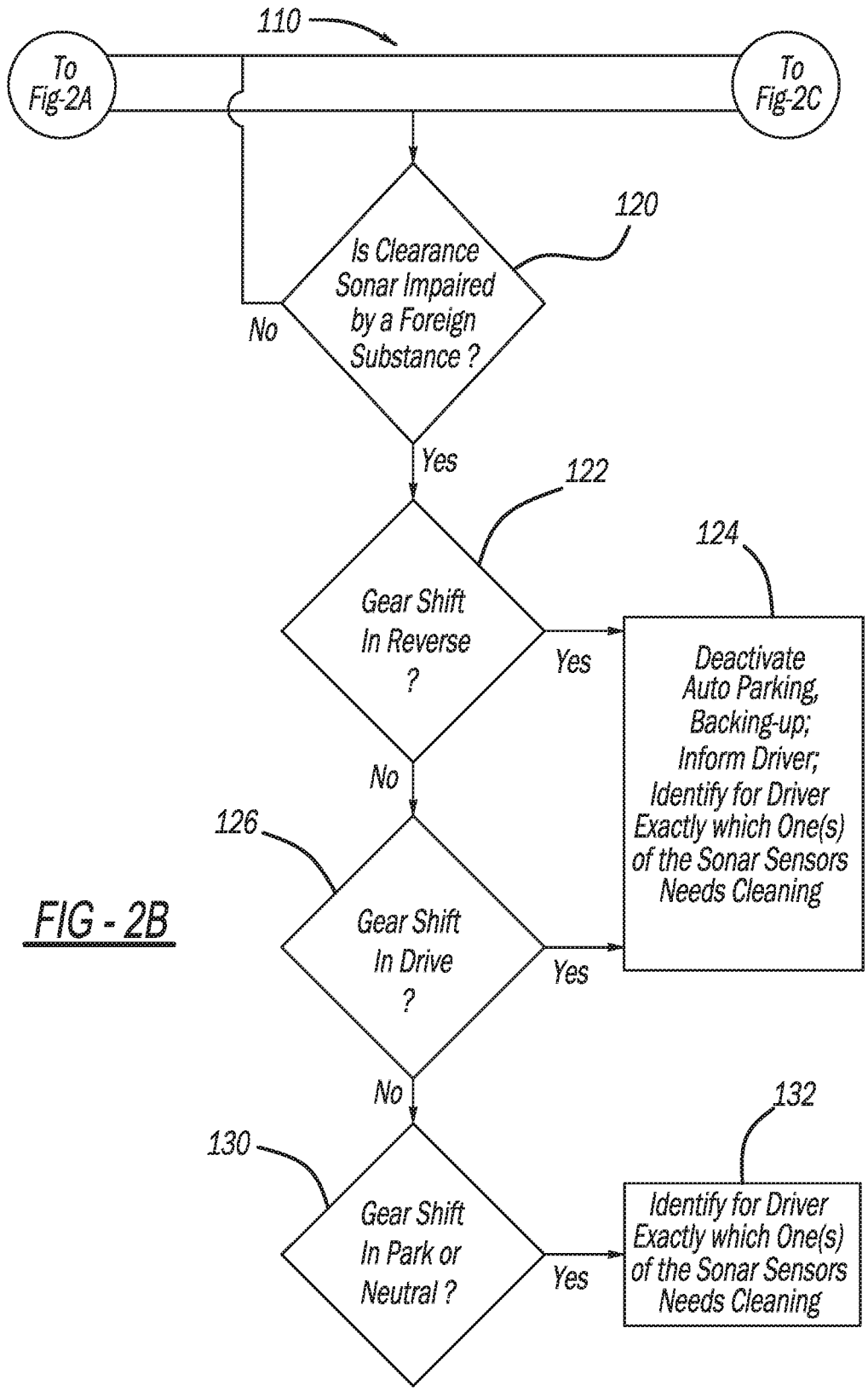
FIG. 2B is a continuation of FIG. 2A.

With reference to block 120 of FIG. 2B, if the control module 50 determines that one or more of the sonar sensors 30A-30D is obscured by a foreign substance, the control module 50 proceeds to block 122. If none of the sonar sensors 30A-30D are obscured by a foreign substance, the control module 50 returns to block 112. At block 122, the control module 50 identifies the gear position of the vehicle based on data received from the gear shift detection sensor 54. If the vehicle is in reverse, the control module 50 proceeds to block 124. At block 124, the control module 50 deactivates any of the vehicle safety/navigation systems 52 that rely on any of the sonar sensors 30A-30D that have been impaired, such as automatic parking and/or backup assist features. The control module 50 also operates the display screen 60 to identify the specific sonar sensor 30A-30D in need of cleaning. For example, typically a vehicle has four clearance sonar sensors 30A, 30B, 30C, and 30D, one at each corner of the vehicle 12. Thus, the control module 50 will identify exactly which one(s) of the sensors 30A, 30B, 30C, 30D needs to be cleaned. If at block 122 the vehicle is not in reverse gear, the control module 50 proceeds to block 126, where based on inputs from the gear shift detection sensor 54 the control module 50 determines whether the vehicle is in drive. If the vehicle is in drive, the control module 50 also proceeds to block 124. If at block 126 the vehicle is not in drive, the control module 50 proceeds to block 130. If at block 130 the vehicle 12 is in park or neutral, control module 50 proceeds to block 132. At block 132 the control module 50 identifies for the operator of the vehicle exactly which one of the sonar sensors 30A-30D is impaired, and informs the operator that the specific sonar sensor 30A-30D needs to be cleaned.

With reference to block 140 of FIG. 2C, when the control module 50 determines that one or more of the radar sensors 40A-40D is impaired by a foreign substance, control module 50 proceeds to block 142. If none of the radar sensors 40A-40D are impaired, the control module 50 returns to block 112. At block 142, the control module 50 retrieves the gear position of the vehicle 12 from the gear shift detection sensor 54, and proceeds to block 144 when the vehicle 12 is in reverse. At block 144, the control module 50 operates the display screen 60 to inform the operator that the front radar sensor 40A is obscured by a foreign substance and should be cleaned. The control module 50 can also display the exact location of the front radar sensor 40A to facilitate location thereof by the operator. If at block 142 the vehicle 12 is not in reverse, the control module 50 proceeds to block 146. At block 146 the control module 50 determines if the vehicle 12 is in drive based on inputs from the gear shift detection sensor 54. If the vehicle 12 is in drive, the control module 50 proceeds to block 148. At block 148 the control module 50 deactivates any of the vehicle safety/navigation systems 52 that rely on the front radar sensor 40A, such as a pre-collision (PC) system. The control module 50 will operate the display screen 60 to notify the operator of the vehicle 12 of the particular vehicle safety/navigation systems 52 that have been deactivated, identify the location of the front radar sensor 40A and/or notify the operator that the front radar sensor 40A needs to be cleaned. If at block 146 the vehicle 12 is not in drive, the control module 50 proceeds to block 150. At block 150 the control module 50 determines based on inputs from the gear shift detection sensor 54 whether the vehicle 12 is in park or in neutral. If the vehicle 12 is in park or neutral, control module 50 proceeds to block 152, and operates the display screen 60 to identify the specific location of the front radar sensor 40A and notify the operator that the front radar sensor 40A needs to be cleaned of a foreign substance.

With reference to block 160 of FIG. 2D, the control module 50 determines whether any one or more of the rear radar sensor 40B and side radar sensors 40C and 40D are impaired by a foreign substance. If the control module 50 determines that one or more of the radar sensors 40B, 40C, and/or 40D is impaired, the control module 50 proceeds to block 162, otherwise the control module 50 returns to block 112. At block 162, the control module determines based on inputs from the gear shift detection sensor 54 whether the vehicle 12 is in reverse gear. If the vehicle 12 is in reverse gear, the control module 50 proceeds to block 164. At block 164, the control module 50 deactivates any of the vehicle safety/navigation systems 52 that rely on the radar sensors 40B, 40C, or 40D when the vehicle 12 is in reverse. For example, the control module 50 will deactivate the automatic backup system. The control module 50 will operate the display screen 60 to inform the operator of the specific vehicle safety/navigation systems 52 that have been deactivated, and inform the operator of the specific radar sensors 40B, 40C, and/or 40D that have been impaired by a foreign substance and thus need to be cleaned, as well as the specific location of the radar sensors 40B, 40C, and/or 40D that need to be cleaned in order to facilitate cleaning thereof.

If at block 162 the vehicle 12 is not in reverse gear, the control module 50 proceeds to block 166. At block 166 the control module 50 determines whether the vehicle is in drive based on inputs from the gear shift detection sensor 54. If the vehicle 12 is in drive, the control module 50 proceeds to block 168. At block 168 the control module 50 deactivates any one or more of the vehicle safety/navigation systems 52 that rely on the specific one(s) of the radar sensors 40B, 40C, 40D that have been impaired by the foreign substance. Control module 50 also operates the display screen 60 to inform the operator of which ones of the vehicle safety/navigation systems 52 have been deactivated. Furthermore, the control module 50 operates the display screen 60 to identify the exact location of the particular ones of the radar sensors 40B, 40C, 40D that have been impaired to help the operator easily identify the location(s) thereof. If at block 166 the vehicle 12 is not in drive, the control module 50 proceeds to block 170. At block 170 the control module 50 determines whether the vehicle 12 is in park or neutral based on inputs from the gear shift detection sensor 54. If the vehicle 12 is in park or neutral, the control module 50 proceeds to block 172. At block 172 the control module 50 operates the display screen 60 to identify the specific ones of the radar sensors 40B, 40C, and/or 40D in need of cleaning.

The present disclosure thus advantageously provides a diagnostic system 10 that identifies the specific vehicle sensors that have been impaired by a foreign substance so that a vehicle operator can easily locate and clean the impaired sensors. The diagnostic system 10 also deactivates any vehicle safety/navigation systems 52 that rely on one or more of the impaired sensors to facilitate safe operation of the vehicle. The operator of the vehicle is alerted of sensors in need of cleaning based on the gear shift position of the vehicle (such as drive, reverse, neutral, or park). This advantageously reduces the number of unnecessary warnings being issued to the vehicle operator and reduces distractions to the driver. For example, the driver will only be notified when rear sensors are impaired by a foreign substance when the vehicle is shifted to reverse. Thus when the vehicle is in drive and the vehicle is operating forward, the operator will not be distracted by sensor warnings relevant to only rear sensors used when the vehicle is in reverse. One skilled in the art will appreciate that the present disclosure provides numerous additional advantages over the art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A diagnostic system for identifying vehicle sensors impaired by a foreign substance, the system comprising:
    a plurality of vehicle sensors configured to facilitate navigation of a vehicle in an environment;
    a gear shift detection sensor configured to detect a gear position of the vehicle; and
    a control module configured to:
        identify which of the plurality of vehicle sensors is impaired by a foreign substance; and
        identify for an operator of the vehicle which of the plurality of vehicle sensors is impaired due to the foreign substance based on the gear position of the vehicle.

2. The diagnostic system of claim 1, wherein the plurality of vehicle sensors are configured to be mounted to the vehicle at locations where performance of the plurality of vehicle sensors may become impaired by the foreign substance.

3. The diagnostic system of claim 1, wherein the control module is further configured to, based on the gear position of the vehicle, notify the operator of the vehicle that a feature of the vehicle is unavailable because one or more of the plurality of vehicle sensors is impaired by the foreign substance.

4. The diagnostic system of claim 1, wherein the control module is further configured to deactivate a vehicle feature that relies on one or more of the plurality of sensors impaired by presence of the foreign substance.

5. The diagnostic system of claim 1, wherein the plurality of vehicle sensors include at least one of a radar sensor, LIDAR sensor, ultrasonic sensor, vehicle-to-vehicle sensor, vehicle-to-infrastructure sensor, and a camera.

6. The diagnostic system of claim 1, wherein the plurality of vehicle sensors include at least one of the following: a surround view camera; a clearance sonar; front radar; rear radar; and side radar.

7. The diagnostic system of claim 1, wherein:
    the plurality of vehicle sensors include a clearance sonar; and
    when the control module detects that the clearance sonar is impaired by the foreign substance, and the gear position of the vehicle is detected to be in reverse or drive by the gear shift detection sensor, the control module is configured to: deactivate at least one of automatic parking and back-up assist features of the vehicle and inform the operator of the deactivation; and inform the operator that a foreign substance needs to be cleaned from the clearance sonar.

8. The diagnostic system of claim 1, wherein:
    the plurality of vehicle sensors include a front radar sensor; and
    when the control module detects that the front radar sensor is impaired by the foreign substance, and the gear position of the vehicle is detected to be in drive by the gear shift detection sensor, the control module is configured to: deactivate a pre-collision system of the vehicle; inform the operator of the vehicle that the pre-collision system has been deactivated; and inform the operator that a foreign substance needs to be cleaned from the pre-collision sensor.

9. The diagnostic system of claim 1, wherein:
the plurality of vehicle sensors include a rear radar sensor and side radar sensors;
wherein when the control module detects that any one of the rear radar sensor and the side radar sensors are impaired by the foreign substance, and the gear position of the vehicle is detected to be in reverse by the gear shift detection sensor, the control module is configured to: deactivate a back-up assist feature of the vehicle; inform the operator of the vehicle that the back-up assist feature have been deactivated; and inform the operator that a foreign substance needs to be cleaned from at least one of the rear radar sensor and side radar sensors.

10. The diagnostic system of claim 1, wherein:
the plurality of vehicle sensors include a rear radar sensor and side radar sensors;
wherein when the control module detects that any one of the rear radar sensor and the side radar sensors are impaired by the foreign substance, and the gear position of the vehicle is detected to be in drive by the gear shift detection sensor, the control module is configured to: deactivate a lane change assist feature of the vehicle; inform the operator of the vehicle that the lane change assist feature has been deactivated; and inform the operator that a foreign substance needs to be cleaned from at least one of the rear radar sensor and side radar sensors.

11. The diagnostic system of claim 1, wherein when the control module detects presence of the foreign substance at any of the plurality of vehicle sensors, and the gear position of the vehicle is in park, the control module identifies for the operator which of the plurality of vehicle sensors is impaired by the foreign substance.

12. The diagnostic system of claim 1, wherein the control module measures optical flow captured by the plurality of vehicle sensors to identify which of the plurality of vehicle sensors is impaired by the foreign substance.

13. The diagnostic system of claim 1, wherein the control module measures optical contrast captured by the plurality of vehicle sensors to identify which of the plurality of vehicle sensors is impaired by the foreign substance.

14. The diagnostic system of claim 1, wherein the control module measures reflection strength of the plurality of vehicle sensors to identify which of the plurality of vehicle sensors is impaired by the foreign substance.

15. A diagnostic system for identifying vehicle sensors impaired by a foreign substance, the system comprising:
a plurality of vehicle sensors configured to facilitate navigation of a vehicle in an environment;
a gear shift detection sensor configured to detect a gear position of the vehicle; and
a control module configured to:
identify which of the plurality of vehicle sensors is impaired by a foreign substance and needs to be cleaned to remove the foreign substance;
deactivate a vehicle feature that relies on one or more of the plurality of sensors impaired by the foreign substance;
inform an operator of the vehicle which of the plurality of sensors is impaired by the foreign substance and needs to be cleaned based on the gear position of the vehicle such that the operator is only informed of the impaired ones of the plurality of sensors used during operation of the vehicle in the detected gear position; and
inform the operator of the vehicle of the features that have been deactivated based on the gear position of the vehicle such that the operator is only informed of the vehicle features used during operation of the vehicle in the detected gear position.

16. The diagnostic system of claim 15, wherein the plurality of vehicle sensors include at least one of a radar sensor, LIDAR sensor, ultrasonic sensor, vehicle-to-vehicle sensor, vehicle-to-infrastructure sensor, and a camera.

17. The diagnostic system of claim 15, wherein the plurality of vehicle sensors include at least one of the following: a surround view camera; a clearance sonar; front radar; rear radar; and side radar.

18. The diagnostic system of claim 15, wherein:
the plurality of vehicle sensors include a clearance sonar; and
when the control module detects that the clearance sonar is impaired by the foreign substance, and the gear position of the vehicle is detected to be in reverse or drive by the gear shift detection sensor, the control module is configured to: deactivate at least one of automatic parking and back-up assist features of the vehicle and inform the operator of the deactivation; and inform the operator that a foreign substance needs to be cleaned from the clearance sonar.

19. The diagnostic system of claim 15, wherein:
the plurality of vehicle sensors include a front radar sensor; and
when the control module detects that the front radar sensor is impaired by the foreign substance, and the gear position of the vehicle is detected to be in drive by the gear shift detection sensor, the control module is configured to: deactivate a pre-collision system of the vehicle; inform the operator of the vehicle that the pre-collision system has been deactivated; and inform the operator that a foreign substance needs to be cleaned from the pre-collision sensor.

20. The diagnostic system of claim 15, wherein:
the plurality of vehicle sensors include a rear radar sensor and side radar sensors;
wherein when the control module detects that any one of the rear radar sensor and the side radar sensors are impaired by the foreign substance, and the gear position of the vehicle is detected to be in reverse by the gear shift detection sensor, the control module is configured to: deactivate a back-up assist feature of the vehicle; inform the operator of the vehicle that the back-up assist feature have been deactivated; and inform the operator that a foreign substance needs to be cleaned from at least one of the rear radar sensor and side radar sensors.

* * * * *